United States Patent Office 2,842,542
Patented July 8, 1958

2,842,542
STEROID PRODUCTION

Philip F. Beal, Portage Township, Kalamazoo County, Mich., assignor to The Upjohn Company, Kalamazoo, Mich., a corporation of Michigan No Drawing. Application June 20, 1955
Serial No. 516,770

11 Claims. (Cl. 260—239.55)

This invention relates to a novel process for the selective oxidation of the 20α-hydroxy group of 21-acyloxy-17α,20α-dihydroxy-4-pregnen-3-ones and is more particularly concerned with the production of 21-acyloxy-11β,-17α-dihydroxy-4-pregnene - 3,20 - diones (hydrocortisone 21-ester) through selective oxidation of 21-acyloxy-11β,-17α,20α-trihydroxy-4-pregnen-3-ones with activated manganese dioxide.

The present process comprises selectively oxidizing the 20α-hydroxy group of 21-acyloxy-17α,20α-dihydroxy-4-pregnen-3-ones, particularly 21-acyloxy-11β,17α,20α-trihydroxy-4-pregnen-3-ones wherein the acyloxy group is AcO, Ac being the acyl radical of an organic carboxylic acid containing from one to eight carbon atoms, inclusive, with a suspension of activated manganese dioxide in an organic solvent to obtain the corresponding 21-acyloxy-11β,17α-dihydroxy-4-pregnene-3,20-diones.

The present starting compounds, 21-acyloxy-17α20α-dihydroxy-4-pregnen-3-ones particularly 21-acyloxy-11β,-17α,20α-trihydroxy-4-pregnen-3-ones, are new products obtained in the oxidation of the corresponding 21-acyloxy-4,17(20)-pregnadien-3-ones (I) with osmium tetroxide and trithanolamine oxide.

Oxidation of a 20α-hydroxy group in a 21-acyloxy-17α,20α-dihydroxy-4-pregnen-3-one to obtain, depending on the substituent in the 11-position, compound F, compound E, Reichstein's substance S, esters thereof and the like, presented unusual difficulties. For example, N-bromoacetamide oxidized only the 11β-hydroxy group of 11β,17α,20α - trihydroxy - 21 - acyloxy - 4 - pregnen - 3-one; chromic acid in acetic acid solution oxidized the whole 17β-side chain and the 11β-hydroxy group of the same compound to give adrenosterone, periodic acid oxidation resulted in various decomposition products such as 11β-hydroxy-4-androstene-3,17-dione, but none of the valuable highly active adrenocortical hormones such as cortisone or hydrocortisone 21-esters, Reichstein's substance S and the like could be obtained. It was therefore suprising to find that manganese dioxide can selectively convert the 20α-hydroxy group of a 21-acyloxy-17α,20α-trihydroxy-4-pregnene-3,20-dione to the corresponding hydrocortisone ester.

It is an object of the present invention to provide a novel process for the conversion of 21-acyloxy-11β,17α,-20α-trihydroxy-4-pregnen-3-one to the corresponding hydrocortisone 21-organic carboxylic acid ester by a selective oxidation process. Another more specific object is the provision of a novel process for the production of 21-hydrocarbon carboxylic acid esters of hydrocortisone, wherein the hydrocarbon carboxlic acid has from one to eight carbon atoms, by selective oxidation. Another object of the present invention is the provision of a selective process of oxidation of the 20α-hydroxy group without simultaneous oxidation of other possible hydroxy groups or double bonds. For example, oxidation of 21-acyloxy-11α,17α,20α-trihydroxy-4-pregnen-3-one with manganese dioxide yields 11-epi "F" acylate (21-acyloxy-11α,17α-dihydroxy-4-pregnene-3,20-dione); oxidation of 21-acyloxy-17α,20α-trihydroxy-4-pregnen-3-one yields Reichstein's compound "S" acylate (21-acyloxy-17α-hydroxy-4-pregnene-3,20-dione) and oxidation of 21-acyloxy-17α,20α-dihydroxy-4-pregnene-3,11-dione results in 21-acylates of cortisone. Other objects will be apparent to those skilled in the art to which this invention pertains.

The starting compounds of the present application are 21-acyloxy-17α,20α-dihydroxy-4-pregnen-3-ones such as 21 - acyloxy - 11β,17α,20α - trihydroxy - 4 - pregnen - 3-one, 21 - acyloxy - 11α,17α,20α - trihydroxy - 4 - pregnen-3 - one, 11α,21 - diacyloxy - 17α,20α - dihydroxy - 4 - pregnen - 3 - one, 21 - acyloxy - 17α,20α - dihydroxy - 4 - pregnene-3,11-dione and 21-acyloxy-17α,20α-dihydroxy-4-pregnen-3-one, and the like, with 21-acyloxy-11β,17α,20α-trihydroxy-4-pregnen-3-one preferred, wherein the acyloxy group is AcO, Ac being the acyl radical of a carboxylic organic acid possessing from one to eight carbon atoms and in the preferred embodiment of the invention a hydrocarbon carboxylic acid having from one to eight carbon atoms, inclusive. It should be noted that the mild reaction conditions do not produce changes in the acyl radical, such as oxidation and breakage of double bonds with the exception of a possible oxidation of a secondary alcoholic group to a keto group. For the purpose of the present invention such an oxidation in the acyl group is, however, inconsequential since the thus-produced hydrocortisone ester, 11-epi "F" mono- or diester, compound "S" ester or cortisone ester is either of direct value or may be hydrolyzed and reesterified to give the corresponding steroid ester with desired properties. The preparation of the starting compounds is shown in detail in preparations 1 through 8. Representative starting compounds thus obtained comprise: 21-acetoxy-11β,17α,20α-trihydroxy - 4 - pregnen - 3 - one, 21 - propionyloxy-11β,17α,20α - trihydroxy - 4 - pregnen - 3 - one, 21 - butyryloxy - 11β,17α,20α - trihydroxy - 4 - pregnen - 3 - one, 21 - isobutyryloxy - 11β,17α,20α - trihydroxy - 4 pregnen - 3 - one, 21 - valeryloxy - 11β,17α,20α - trihydroxy-4 - pregnen - 3 - one, 21 - isovaleryloxy - 11β,17α,20α-trihydroxy - 4 - pregnen - 3 - one, 21 - hexanoyloxy - 11β,-17α,20α - trihydroxy - 4 - pregnen - 3 - one, 21 - heptanoyloxy - 11β,17α,20α - trihydroxy - 4 - pregnen - 3 - one, 21 - octanoyloxy - 11β,17α,20α - trihydroxy - 4 - pregnen-3 - one, 21 - (β - cyclopentylpropionyloxy) - 11β,17α,20α-trihydroxy - 4 - pregnen - 3 - one, 21 - benzoyloxy - 11β,-17α,20α - trihydroxy - 4 - pregnen - 3 - one, 21 - phenylacteoxy - 11β,17α,20α - trihydroxy - 4 - pregnen - 3 - one, 21 - toluyloxy - 11β,17α,20α - trihydroxy - 4 - pregnen - 3-one, 21 - cinnamyloxy - 11β,17α,20α - trihydroxy - 4 - pregnen - 3 - one, 21 - gallyloxy - 11β,17α,20α - trihydroxy - 4-pregnen - 3 - one, 21 - salicyloyloxy - 11β,17α,20α - trihydroxy - 4 - pregnen - 3 - one, 21 - anisoyloxy - 11β,17α,-20α - trihydroxy - 4 - pregnen - 3 - one, 21 - benzenesulfonyloxy - 11β,17α,20α - trihydroxy - 4 - pregnen - 3-one, 21 - para - chlorobenzenesulfonyloxy - 11β,17α,20α-trihydroxy - 4 - pregnen - 3 - one, 21 - toluenesulfonyloxy - 11β,17α,20α - trihydroxy - 4 - pregnen - 3 - one, 21-benzenephosphonyloxy - 11β,17α,20α - trihydroxy - 4-pregnen - 3 - one, 21 - trimethylacetoxy - 11β,17α,20α-trihydroxy - 4 - pregnen - 3 - one, 21 - monochloroacetoxy-11β,17α,20α - trihydroxy - 4 - pregnen - 3 - one, 21 - dichloroacetoxy - 11β,17α,20α - trihydroxy - 4 - pregnen - 3-one, 21 - trichloroacetoxy - 11β,17α,20α - trihydroxy - 4-pregnen - 3 - one, 21 - para - chlorobenzoyloxy - 11β,17α,-20α - trihydroxy - 4 - pregnen - 3 - one, 21 - para - bromobenzoyloxy - 11β,17α,20α - trihydroxy - 4 - pregnen - 3-one, 21 - meta - nitrobenzoyloxy - 11β,17α,20α - trihydroxy - 4 - pregnen - 3 - one, 21 - (3,5 - dinitrobenzoyloxy) - 11β,17α,20α - trihydroxy - 4 - pregnen - 3 - one, 21 - hemiquinolinoyloxy - 11β,17α,20α - trihydroxy - 4- pregnen - 3 - one, 21 - nicotinyloxy - 11β,17α,20α - trihydroxy - 4 - pregnen - 3 - one, 21 - piperonyloyloxy - 11β,17α,20α - trihydroxy - 4 - pregnen - 3 - one, 21 - (2-furoyloxy) - 11β,17α,20α - trihydroxy - 4 - pregnen - 3 - one, 21 - hemitartaryloxy - 11β,17α,20α - trihydroxy - 4 - pregnen - 3 - one, 21 - dihydrogencitryloxy - 11β,17α,20α - trihydroxy - 4 - pregnen - 3 - one, 21 - maleyloxy - 11β,17α,20α - trihydroxy - 4 - pregnen - 3 - one, 21 - fumaryloxy - 11β,17α,20α - trihydroxy - 4 - pregnen - 3 - one, 21 - thioglycollyloxy - 11β,17α,20α - trihydroxy - 4 - pregnen - 3 - one, 21 - bromoacetoxy - 11β,17α,20α - trihydroxy - 4 - pregnen - 3 - one, 21 - vinylacetoxy - 11β,17α,20α - trihydroxy - 4 - pregnen - 3 - one, 21 - (β - methylcrotonyloxy) - 11β,17α,20α - trihydroxy - 4 - pregnen - 3 - one, and the like, as well as the 21-acyloxy-11α,17α,20α-trihydroxy-4 - pregnen - 3 - ones, 21 - acyloxy - 17α,20α - dihydroxy-4 - pregnene - 3,11-dione, 11α,21 - diacyloxy - 17α,20α-dihydroxy - 4 - pregnen - 3 - one and 21 - acyloxy - 17α,20α-dihydroxy-4-pregnen-3-ones wherein the acyloxy groups are illustratively: formyloxy, acetoxy, propionyloxy, butyryloxy, isobutyryloxy, valeryloxy, isovaleryloxy, hexanoyloxy, heptanoyloxy, octanoyloxy, β-cyclopentyl-propionyloxy, benzoyloxy, phenylacetoxy, toluyloxy, cinnamyloxy, galloyloxy, salicyloxy, anisyloxy, benzenesulfonyloxy, parachlorobenzenesulfonyloxy, toluenesulfonyloxy, benzenephosphonyloxy, trimethylacetoxy, monochloroacetoxy, dichloroacetoxy, trichloroacetoxy, parachlorobenzoyloxy, para-bromobenzoyloxy, meta-nitrobenzoyloxy, 3,5-dinitrobenzoyloxy, hemiquinolinoyloxy, nicotinyloxy, piperonyloyloxy, 2-furoyloxy, hemitartaryloxy, dihydrogencitryloxy, maleyloxy, fumaryloxy, thioglycollyloxy, bromoacetoxy, vinylacetoxy, β-methylcrotonyloxy, and the like.

In carrying out the process of the present invention the selected 21-acyloxy-17α,20α-dihydroxy-4-pregnen-3-one, dissolved or suspended in an organic solvent such as ethyl acetate, acetone, tetrahydrofuran, carbon tetrachloride, choloroform, methylene dichloride, dioxane, mixtures of saturated hydrocarbons of the $C_5$ to the $C_8$ series, especially mixtures of hexanes (Skellysolve B), with ethyl acetate preferred is admixed with manganese dioxide in a weight ratio of about five to twenty times the weight of manganese dioxide to the weight of steroid. The ratio of manganese dioxide to starting steroid is not critical, larger or smaller proportions of manganese dioxide while being operative, are, however, of no advantage.

The temperature range is desirably between about minus ten and plus sixty degrees centigrades with a range between plus ten to 35 degrees being preferred. In the preferred embodiment of the invention the reaction mixture is either shaken or stirred for periods of from one to ten days. At room tempertaure, between about twenty and about thirty degrees centigrade, the period of reaction is between one to four days. The manganese dioxide used in the process may be either a commercial grade or preferably active manganese dioxide prepared, for example, by the method of Attenburrow et al. [J. Chem. Soc. 1094 (1952)] or by the methods of Harfenist et al. [J. Org. Chem. 19, 1608 (1954)]. After the reaction is terminated, the product is isolated by conventional procedures, suitably the reaction mixture is filtered to remove the oxides of manganese, the filtrate containing the product is evaporated to remove the solvent, and the residue is subjected to fractionating procedures such as recrystallization, extractions and chromatography as described more fully in the examples.

The following examples illustrate the process and products of the present invention but are not to be construed as limiting.

PREPARATION 1

*3,11-diketo-4,17(20)-pregnadien-21-oic acid methyl ester*

One milliliter of bromine (3.09 grams) was added dropwise to a stirred solution of 4.50 grams (0.01 mole) of sodium enolate of 11-keto-21-ethoxyoxalylprogesterone, prepared in the manner shown in U. S. Patent 2,683,724, and thereto was added two grams of potassium acetate, dissolved in 150 milliliters of methanol. When the addition was complete, 3.24 grams of sodium methoxide in 40 milliliters of methanol was added and the reaction mixture was maintained at about 25 degrees centigrade for sixteen hours. The reaction mixture was then poured into a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadien-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, substituting the sodium enolate of 11α-hydroxy - 21 - ethoxyoxalylprogesterone, U. S. Patent 2,683,724, for the sodium enolate of 11-keto-21-ethoxyoxalylprogesterone used in the reaction described above is productive of methyl 3-keto-11α-hydroxy-4,17(20)-pregnadien-21-oate. The sodium enolate of 21-ethoxyoxalylprogesterone is similarly converted to methyl 3-keto-4,17(20)-pregnadien-21-oate.

PREPARATION 2

*3-ethylene glycol ketal of 3,11-diketo-4,17(20)-pregnadien-21-oic acid methyl ester*

To a solution of 1.5 grams (0.0042 mole) of 3,11-diketo-4,17(20)-pregnadien-21-oic acid methyl ester, dissolved in 150 milliliters of benzene, was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadien-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadien-21-oic acid methyl ester. The yield of product was 87 percent of the theoretical calculated on the amount of starting steroid which reacted.

*Analysis.*—Calculated for $C_{24}H_{32}O_3$: C, 71.94; H, 8.05. Found: C, 71.90; H, 7.95.

Substituting methyl 3-keto-11α-hydroxy-4,17(20)-pregnadien-21-oate for the methyl 3,11-diketo-4,17(20)-pregnadien-21-oate as starting steroid in the reaction described above is productive of the 3-ethylene glycol ketal of methyl 3-keto-11α-hydroxy-4,17(20)-pregnadien-21-oate. Methyl 3-keto-4,17(20)-pregnadien-21-oate is similarly converted to the 3-ethylene glycol ketal of methyl 3-keto-4,17(20)-pregnadien-21-oate.

PREPARATION 3

*3-ethylene glycol ketal of 11β,21-dihydroxy-4,17(20)-pregnadien-3-one*

A solution of 1.50 grams of the 3-ethylene glycol ketal of 3,11-diketo-4,17(20)-pregnadien-21-oic acid ethyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to give 1.003 grams, a yield of 72 percent of the theoretical of crystalline 3-ethylene glycol ketal of 11β,21-dihydroxy-4,17(20)-pregnadien-3-one in two crops. The first crop, the analysis of which is given below, melted at 191 to 194 degrees centigrade and the second, melted at 172 to 180 degrees centigrade.

Analysis.—Calculated for $C_{23}H_{34}O_4$: C, 73.76; H, 9.15. Found: C, 73.87; H, 9.22.

Substituting methyl 3-keto-11a-hydroxy-4,17(20)-pregnadien-21-oate for the methyl 3,11-diketo-4,17(20)-pregnadien-21-oate as starting steroid in the reaction described above is productive of the 3-ethylene glycol ketal 11a,21-dihydroxy-4,17(20)-pregnadien-3-one. Methyl 3-keto-4,17(20)-pregnadien-21-oate is similarly converted to the 3-ethylene glycol ketal 21-hydroxy-4,17(20)-pregnadien-3-one.

PREPARATION 4

11β,21-dihydroxy-4,17(20)-pregnadien-3-one

A solution of 0.572 gram (0.0015 mole) of the 3-ethylene glycol ketal of 11β,21-dihydroxy-4,17(20)-pregnadien-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was evaporated from the mixture. Methylene chloride and more water were then added to the remaining reaction mixture, the methylene chloride layer removed and the solvent distilled therefrom. The residue, after drying in vacuo, consisted of 0.518 gram of 11β,21-dihydroxy-4,17(20)-pregnadien-3-one.

Substituting the 3-ethylene glycol ketal of 11a,21-hydroxy-4,17(20)-pregnadien-3-one as the starting steroid in the above-described reaction is productive of 11a,21-dihydroxy-4,17(20)-pregnadien-3-one. The 3-ethylene glycol ketal of 21-hydroxy-4,17(20)-pregnadien-3-one is similarly hydrolyzed to 21-hydroxy-4,17(20)-pregnadien-3-one.

PREPARATION 5

21-acetoxy-11β-hydroxy-4,17(20)-pregnadien-3-one

A solution of 0.518 gram of 11β,21-dihydroxy-4,17(20)-pregnadien-3-one in five milliliters of pyridine was mixed with two milliliters of acetic anhydride and the whole was then maintained at room temperature (twenty to thirty degrees centigrade) for seventeen hours whereafter crushed ice was added thereto. The precipitated 21-acetoxy-11β-hydroxy-4,17(20)-pregnadien-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom and the crystalline residue was crystallized from a mixture of ethyl acetate and Skellysolve B hexanes to yield as the first crop 0.253 gram, a yield of 45 percent of the theoretical, of 21-acetoxy-11β-hydroxy-4,17(20)-pregnadien-3-one melting at 183 to 186 degrees centigrade.

Analysis.—Calculated for $C_{23}H_{32}O_4$: C, 74.16; H, 8.66. Found: C, 74.18; H, 8.45; C, 73.95; H, 8.74.

Similarly, esterifying 21-hydroxy-4,17(20)-pregnadien-3-one in the manner described above with acetic anhydride is productive of 21-acetoxy-4,17(20)-pregnadien-3-one. 21-Acetoxy-11a-hydroxy-4,17(20) - pregnadien - 3-one and 11a,21-diacetoxy-4,17(20)-pregnadien-3-one, respectively, are similarly prepared by employing about one molar equivalent respectively a large molar equivalent excess of acetic anhydride, in the manner described above with 11β,21-dihydroxy-4,17(20)-pregnadien-3-one.

Other esters of 11β,21-dihydroxy-4,17(20)-pregnadien-3-one and 11a-hydroxy-4,17(20)-pregnadien-3-ones are prepared by reacting 11β,21-dihydroxy-4,17(20)-pregnadien-3-one or 21-hydroxy-4,17(20)-pregnadien-3-one with an acid anhydride or an acyl halide such as an acyl bromide or an acyl chloride, of the acid selected to obtain the corresponding 21-ester. Using a molar equivalent of acylating agent with a molar equivalent of 11a,21-dihydroxy-4,17(20)-pregnadien-3-one, the corresponding 21-monoester, 21-acyloxy-11a - hydroxy - 4,17(20) - pregnadien-3-one, is obtained; by using an excess of acylating reagent (usually from two to ten moles of acylating agent) the 11a,21-di-esters of 11a,21-dihydroxy-4,17-(20)-pregnadien-3-one are obtained. In this manner the following representative 21-esters of 11β,21-dihydroxy-4,17(20)-pregnadien-3-one, 11a,21-dihydroxy - 4,17(20)-pregnadien-3-one and 21-hydroxy-4,17(20)-pregnadien-3-one as well as the 11a,21-di-esters of 11a,21-dihydroxy-4,17(20)-pregnadien-3-one are prepared: propionates, butyrates, isobutyrates, valerates, isovalerates, hexanoates, heptanoates, octanoates, β-cyclopentyl-propionates, benzoates, phenylacetates, toluates, cinnamates, gallates, salicylates, anisates, benzenesulfonates, para-chlorobenzenesulfonates, toluenesulfonates, benzenephosphonates, trimethylacetates, monochloroacetates, dichloroacetates, trichloroacetates, para-chlorobenzoates, para-bromobenzoates, meta-nitrobenzoates, 3,5-dinitrobenzoates, hemiquinolinates, nicotinates, piperonates, 2-furoates, hemisuccinates, hemitartrates, dihydrogencitrates, maleates, fumarates, thioglycollates, bromoacetates, crotonates, β-methylcrotonates, and the like.

PREPARATION 6

Triethanolamine oxide

To 74.6 grams (0.50 mole) of triethanolamine was added with stirring 34 grams (0.50 mole) of a fifty percent aqueous solution of hydrogen peroxide over a period of thirteen minutes. The temperature of the mixture rose to forty degrees centigrade. After the reaction mixture was maintained at room temperature (twenty to thirty degrees centigrade) for 24 hours, it was diluted with fifty milliliters of water containing a small amount of catalase, causing a small amount of gas to evolve from the mixture. The resulting solution was distilled at about sixty to seventy degrees centigrade at reduced pressure leaving a crystalline residue. This residue was triturated with 200 milliliters of hot acetone. The resulting slurry was cooled and the crystals filtered therefrom. The crystalline triethanolamine oxide thus obtained melted at 103 to 105 degrees centigrade and gave no titration with ceric sulfate, a reagent sensitive to hydrogen peroxide [Jones and Burns, J. Am. Chem. Soc. 47, 2966 (1925)].

PREPARATION 7

*21-acetoxy-11β,17α,20-trihydroxy-4-pregnen-3-one*

A. HYDROXYLATION WITH TRIETHANOLAMINE OXIDE

A mixture of 372 milligrams (1.0 millimole) of 21-acetoxy-11β-hydroxy-4,17(20)-pregnadien-3-one, 3.7 milligrams of osmium tetroxide ($OsO_4$), and 0.5 milliliter of pyridine in twenty milliliters of tertiary butyl alcohol containing about 0.1 percent water was stirred for one hour and 496 milligrams (3.0 millimoles) of triethanolamine oxide was then added. The resulting mixture was stirred for twenty hours at room temperature. Twenty milliliters of a 0.5 percent aqueous solution of $Na_2SO_3$ was added and the mixture stirred for one-half hour. The solution was concentrated to fifteen milliliters by distillation at reduced pressure, extracted with four fifty-milliliter portions of methylene chloride, the methylene chloride extracts were dried and then poured over thirty grams of acid washed alumina. The column was developed with methylene chloride containing increasing amounts of acetone. There was recovered 344 milligrams of steroid from the column, of which 238 milligrams was starting material and 106 milligrams was 21-acetoxy-11β,17α,20α-trihydroxy-4-pregnen-3-one. The yield of hydroxylated steroid, calculated on the starting steroid which reacted, was eighty percent of the theoretical.

Following the procedure described in Preparation 7 with the compounds prepared in Preparation 5 as starting materials and using triethanolamine oxide, tertiary butyl alcohol, pyridine, water, and osmium tetroxide as catalyst, the corresponding 21-acyloxy-11β,17α,20α-trihydroxy-4-pregnen-3-ones, 21 - acyloxy-11α,17α,20-trihydroxy-4-pregnen-3-ones, 11α,21-diactyloxy-17α,20α-dihydroxy-4-pregnen-3-ones and the 21-acyloxy-17α,20α-dihydroxy-4-pregnen-3-one are obtained wherein the acyloxy groups are illustratively: formyloxy, acetoxy, propionyloxy, butyryloxy, isobutyryloxy, valeryloxy, isovaleryloxy, hexanoyloxy, heptanoyloxy, octanoyloxy, β-cyclopentylpropionyloxy, benzoyloxy, phenylacetoxy, toluyloxy, cinnamyloxy, gallyloxy, salicyloyloxy, anisyloxy, benzenesulfonyloxy, para-chlorobenzenesulfonyloxy, toluenesulfonyloxy, benzenephosphonyloxy, trimethylacetoxy, monochloroacetoxy, dichloroacetoxy, trichloroacetoxy, para-chlorobenzoyloxy, para-bromobenzoyloxy, meta-nitrobenzoyloxy, 3,5-dinitrobenzoyloxy, hemiquinolinoyloxy, nicotinyloxy, piperonyloyloxy, 2-furoyloxy, hemitartaryloxy, dihydrogencitryloxy, maleyloxy, fumaryloxy, thioglycollyloxy, bromoacetoxy, vinylacetoxy, β-methylcrotonyloxy and the like.

PREPARATION 8

*21-acetoxy-17α,20α-dihydroxy-4-pregnen-3,11-dione*

A suspension of a chromic acid pyridine complex was prepared by adding 9.74 grams (97.4 millimoles) of chromic anhydride portionwise with stirring and cooling (to about fifteen to 25 degrees) to 100 milliliters of pyridine. To this suspension was added under stirring 4.87 grams (12.0 millimoles) of 21-acetoxy-11β,17α,20α-trihydroxy-4-pregnen-3-one (Preparation 7) in fifty milliliters of pyridine. The mixture which became almost completely homogeneous, was stirred for a period of sixteen hours at a temperature between about twenty to about 25 degrees centigrade. The reaction mixture thereafter was poured into 600 milliliters of water and extracted with 150 milliliters of methylene chloride. The emulsion which formed by the addition of methylene chloride to the aqueous reaction mixture was separated by filtering the mixture through Celite 545 diatomaceous earth used as a filter aid and as a filter bed. The layers were separated and the aqueous layer extracted three more times with addition of 350 milliliters of methylene chloride. The total methylene chloride extracts were washed twice with water, dried with anhydrous sodium sulfate, filtered and concentrated to dryness. A yield of 4.94 grams was obtained. The solid was taken up in acetone treated with five grams of Magnesol anhydrous magnesium silicate, filtered and concentrated to give a crystalline residue of 3.64 grams. This material was separated by chromatography yielding approximately 47 percent of cortisone acetate, 35 percent of 21-acetoxy-17α,20α-dihydroxy-4-pregnene-3,11-dione, the remainder being adrenosterone. For the chromatographic separation one gram of the 3.64 grams of crude yield were redissolved in methylene dichloride and chromatographed over forty grams of hydrochloric acid washed alumina. Fractions of forty milliliters were collected as indicated in the table.

Fractions 1 to 7 consisted of 17.2 milligrams of adrenosterone. Fractions 8 through 28 inclusive consisted of cortisone acetate. Fractions 29 to 34 inclusive consisted of 21-acetoxy - 17α,20α-dihydroxy-4-pregnene-3,11-dione. Fractions 29 to 34 inclusive were evaporated to give 351 milligrams of crude material which gave 300 milligrams of 21-acetoxy-17α,21α-dihydroxy-4-pregnene-3,11-dione.

In a similar manner oxidation of 21-acetoxy-11α,17α,21α-trihydroxy-4-pregnene-3-one with a chromic acid-pyridine complex yields, besides 21-acetoxy-17α-hydroxy-4-pregnene-3,11,20-trione and adrenosterone, 21-acetoxy-17α,20α-dihydroxy-4-pregnene-3,11-dione.

TABLE I

| Fraction | Solvent | Eluate Solids in Milligrams |
| --- | --- | --- |
| 1 | Methylene chloride | 1 |
| 2 | do | 9 |
| 3 | do | 35 |
| 3a | do | 35 |
| 4 | Methylene chloride-acetone 99:1 | 33 |
| 5 | do | 33 |
| 6 | do | 18 |
| 7 | Methylene chloride-acetone 97:3 | 8 |
| 8 | do | 13 |
| 9 | do | 35 |
| 10 | Methylene chloride-acetone 95:5 | 38 |
| 11 | do | 48 |
| 12 | do | 37 |
| 13 | Methylene chloride-acetone 93:7 | 28 |
| 14 | do | 30 |
| 15 | do | 12 |
| 16 | Methylene chloride-acetone 9:1 | 13 |
| 17 | do | 12 |
| 18 | do | 11 |
| 19 | Methylene chloride-acetone 17:3 | 10 |
| 20 | do | 25 |
| 21 | do | 27 |
| 22 | Methylene chloride-acetone 8:2 | 28 |
| 23 | do | 36 |
| 24 | do | 21 |
| 25 | Methylene chloride-acetone 7:3 | 18 |
| 26 | do | 16 |
| 27 | do | 7 |
| 28 | Methylene chloride-acetone 6:4 | 7 |
| 29 | do | 19 |
| 30 | do | 19 |
| 31 | Methylene chloride-acetone 4:6 | 53 |
| 32 | do | 77 |
| 33 | do | 35 |
| 34 | Acetone-methanol 19:1 | 160 |
| 35 | do | 160 |
| 36 | do | 160 |
|  |  | 995 |

Oxidizing with chromic acid-pyridine complex as shown in Preparation 8 the 21-acyloxy-11β,17α,20α-trihydroxy-4-pregnen-3-ones and 21-acyloxy-11α,17α,20α-trihydroxy-4-pregnen-3-ones obtained and shown in Preparation 7, the corresponding 21-acyloxy-17α,20α-dihydroxy-4-pregnene-3,11-diones are prepared wherein the acyloxy group is illustratively, formyloxy, acetoxy, propionyloxy, butyryloxy, isobutyryloxy, valeryloxy, isovaleryloxy, hexanoyloxy, heptanoyloxy, octanoyloxy, (β-cyclopentylpropionyloxy), benzoyloxy, phenylacetoxy, toluyloxy, cinnamyloxy, gallyloxy, salicyloyloxy, anisoyloxy, benzenesulfonyloxy, para-chloro-benzenesulfonyloxy, toluenesulfonyloxy, benzenephosphonyloxy, trimethylacetoxy, monochloroacetoxy, dichloroacetoxy, trichloroacetoxy, para-chlorobenzoyloxy, para-bromobenzoyloxy, meta-nitrobenzoyloxy, (3,5-dinitrobenzoyloxy), hemiquinolinoyloxy, nicotinyloxy, piperonyloyloxy, (2- furoyloxy), hemitartaryloxy, dihydrogencitryloxy, maleyloxy, fumaryloxy, thioglycollyloxy, bromoacetoxy, vinylacetoxy, β-methylcrotonyloxy, and the like.

EXAMPLE 1

21 - acetoxy - 11β,17α - dihydroxy-4-pregnene-3,20-dione (hydrocortisone 21-acetate) from 21-acetoxy-11β,17α,20α-trihydroxy-4-pregnen-3-one A solution of five grams of 21-acetoxy-11β,17α,20α-trihydroxy-4-pregnen-3-one in 500 milliliters of ethyl acetate was shaken for 72 hours with fifty grams of manganese dioxide, prepared according to the procedure of Attenburrow et al., J. Chem. Soc. 1094 (1952). After the shaking period, the mixture was filtered, the filter cake washed with three 100-milliliter portions of ethyl acetate, the filtrate and additional ethyl acetate washing solutions were combined and the solvent, ethyl acetate, removed in vacuo. A crystalline residue weighing 4.825 grams was obtained. The 4.825 grams of crystalline material was dissolved in methylene dichloride and chromatographed over 300 grams of Florisil anhydrous magnesium silicate. Fractions of 300 milliliters were collected as indicated in Table II.

TABLE II

| Fraction | Solvent | Eluate Solids in Milligrams |
|---|---|---|
| 1 | Methylene chloride | 84 |
| 2 | Acetone-methylene chloride 1:9 | 4 |
| 3 | do | 3 |
| 4 | do | 52 |
| 5 | do | 236 |
| 6 | do | 376 |
| 7 | do | 315 |
| 8 | do | 183 |
| 9 | do | 91 |
| 10 | do | 33 |
| 11 | do | 9 |
| 12 | do | 22 |
| 13 | do | 25 |
| 14 | do | 59 |
| 15 | do | 94 |
| 16 | Acetone-Skellysolve B hexanes 2:8 | 124 |
| 17 | do | 243 |
| 18 | do | 654 |
| 19 | do | 502 |
| 20 | do | 336 |
| 21 | do | 210 |
| 22 | do | 158 |
| 23 | do | 96 |
| 24 | do | 65 |
| 25 | Acetone | 163 |
| 26 | do | 61 |
| 27 | do | 15 |
|  |  | 3,913 |

Fractions 4 through 9 inclusive were combined and evaporated in vacuo. 1.201 grams of acetoxy-11β,17α-dihydroxy-4-pregnen-3-one remain in residue. Fractions 15 through 23 were also combined and the eluate solvent removed by vacuum distillation to give 2.4 grams of starting material 21-acetoxy-11β,17α,20α-trihydroxy-4-pregnen-3-one. The starting material thus recovered may be again subjected to oxidation by activated manganese dioxide to yield additional amounts of hydrocortisone acetate.

In a similar manner oxidizing 21-acetoxy-11α,17α,20α-trihydroxy-4-pregnen-3-one with manganese dioxide in acetone solution 21-acetoxy-11α,17α-dihydroxy-4-pregnene-3,20-dione (epi "F" acetate) is obtained which can be oxidized to cortisone acetate with chromic acid if so desired. Oxidation of 11α,21-diacetoxy-17α,20α-dihydroxy-4-pregnen-3-one with manganese dioxide yielded 11α,21-diacetoxy-17α-hydroxy-4-pregnene-3,20-dione (epi "F" diacetate).

In a similar manner oxidation of 21-acetoxy-17α,20α-dihydroxy-4-pregnene-3,11-dione with manganese dioxide in Skellysolve B-hexanes gave 21-acetoxy-17α-hydroxy-4-pregnene-3,11,20-trione, cortisone acetate, and oxidation of 21-acetoxy-17α,20α-dihydroxy-4-pregnen-3-one gave 21-acetoxy-17α-hydroxy-4-pregnene-3,20-dione (Reichstein's compound "S" acetate).

EXAMPLE 2

21 - propionyloxy - 11β,17α-dihydroxy-4-pregnene-3,20-dione from 21-propionyloxy-11β,17α,20α-trihydroxy-4-pregnen-3-one In the manner given in Example 1, 21 propionyloxy-11β,17α,20α - trihydroxy-4-pregnen-3-one, dissolved in ethyl acetate, was oxidized with activated manganese dioxide to give 21-propionyloxy-11β,17α-dihydroxy-4-pregnene-3,20-dione (hydrocortisone 21-propionate).

In the manner given in Example 1, oxidizing with manganese dioxide:

(a) 21-propionyloxy-11α,17α,20α-trihydroxy - 4 - pregnen-3-one yields 21-propionyloxy-11α,17α-dihydroxy-4-pregnene-3,20-dione.

(b) 11α,21-dipropionyloxy-17α,20α-dihydroxy - 4-pregnen-3-one yields 11α,21-dipropionyloxy-17α-hydroxy-4-pregnene-3,20-dione.

(c) 21-propionyloxy-17α,20α-dihydroxy - 4-pregnen-3-one yields 21-propionyloxy-17α-hydroxy-4-pregnene-3,20-dione (Reichstein's substance "S" propionate).

(d) 21-propionyloxy-17α,20 - dihydroxy - 4 - pregnene-3,11-dione yields 21-propionyloxy-17α-hydroxy-4-pregnene-3,11,20-trione (cortisone propionate).

EXAMPLE 3

21 - butyryloxy - 11β,17α - dihydroxy - 4 - pregnene-3,20 - dione from 21 - butyryloxy - 11β,17α,20α-trihydroxy-4-pregnen-3-one In the manner given in Example 1, 21-butyryloxy-11β,17α,20α - trihydroxy - 4 - pregnen - 3 - one, dissolved in ethyl acetate, was oxidized with activated manganese dioxide to give 21-butyryloxy-11β,17α-dihydroxy-4-pregnene-3,20-dione (hydrocortisone 21-butyrate).

In the maner given in Example 1, oxidizing with manganese dioxide:

(a) 21 - butyryloxy - 11α,17α,20α - trihydroxy - 4-pregnen-3-one yields 21-butyryloxy-11α,17α-dihydroxy-4-pregnene-3,20-dione.

(b) 11α,21 - dibutyryloxy - 17α,20α - dihydroxy - 4 pregnen-3-one yields 11α,21-dibutyryloxy,17α-hydroxy-4-pregnene-3,20-dione.

(c) 21 - butyryloxy - 17α,20α - dihydroxy - 4 - pregnen-3-one yields 21-butyryloxy-17α-hydroxy-4-pregnene-3,20-dione (Reichstein's substance "S" butyrate).

(d) 21 - butyryloxy - 17α,20 - dihydroxy - 4 - pregnene-3,11-dione yields 21-butyryloxy-17α-hydroxy-4-pregnene-3,11,20-trione (cortisone butyrate).

EXAMPLE 4

21 - isobutyryloxy - 11β,17α - dihydroxy - 4 - pregnene-3,20 - dione from 21 - isobutyryloxy - 11β,17α,20α-trihydroxy-4-pregnen-3-one In the manner given in Example 1, 21-isobutyryloxy-11β,17α,20α - trihydroxy - 4 - pregnen - 3 - one, dissolved in ethyl acetate, was oxidized with activated manganese dioxide to give 21 - isobutyryloxy - 11β,17α - dihydroxy - 4 - pregnene - 3,20 - dione (hydrocortisone 21-isobutyrate).

In the manner given in Example 1, oxidizing with manganese dioxide:

(a) 21 - isobutyryloxy - 11α,17α,20α - trihydroxy - 4-pregnen-3-one yields 21-isobutyryloxy-11α,17α-dihydroxy-4-pregnene-3,20-dione.

(b) 11α,21 - diisobutyryloxy - 17α,20α - dihydroxy - 4-pregnen - 3 - one yields 11α,21 - diisobutyryloxy - 17α-hydroxy-4-pregnene-3,20-dione.

(c) 21 - isobutyryloxy - 17α,20α - dihydroxy - 4 - pregnen - 3 - one yields 21 - isobutyryloxy - 17α - hydroxy-4-pregnene-3,20-dione (Reichstein's substance "S" isobutyrate).

(d) 21 - isobutyryloxy - 17α,20 - dihydroxy - 4 - pregnene - 3,11 - dione yields 21 - isobutyryloxy - 17α -hydroxy-4-pregnene-3,11,20-trione (cortisone isobutyrate).

EXAMPLE 5

21 - valeryloxy - 11β,17α - dihydroxy - 4 - pregnene-3,20 - dione from 21 - valeryloxy - 11β,17α,20α - trihydroxy-4-pregnen-3-one

In the manner given in Example 1, 21-valeryloxy-11β,17α,20α - trihydroxy - 4 - pregnen - 3 - one, dissolved in ethyl acetate, was oxidized with activated manganese dioxide to give 21-valeryloxy-11β,17α-dihydroxy-4-pregnene-3,20-dione (hydrocortisone 21-valerate).

In the manner given in Example 1, oxidizing with manganese dioxide:

(a) 21 - valeryloxy - 11α,17α,20α - trihydroxy - 4-pregnen-3-one yields 21-valeryloxy-11α,17α-dihydroxy-4-pregnene-3,20-dione.

(b) 11α,21 - divaleryloxy - 17α,20α - dihydroxy - 4-pregnen-3-one yields 11α,21-divaleryloxy-17α-hydroxy-4-pregnene-3,20-dione.

(c) 21 - valeryloxy - 17α,20α - dihydroxy - 4 - pregnen-3-one yields 21-valeryloxy-17α-hydroxy-4-pregnene-3,20-dione (Reichstein's substance "S" valerate).

(d) 21 - valeryloxy - 17α,20 - dihydroxy - 4 - pregnene-3,11-dione yields 21-valeryloxy-17α-hydroxy-4-pregnene-3,11,20-trione (cortisone valerate).

EXAMPLE 6

21 - isovaleryloxy - 11β,17α - dihydroxy - 4 - pregnene-3,20 - dione from 21 - isovaleryloxy - 11β,17α,20α-trihydroxy-4-pregnen-3-one

In the manner given in Example 1, 21-isovaleryloxy-11β,17α,20α - trihydroxy - 4 - pregnen - 3 - one, dissolved in methylene chloride, was oxidized with activated manganese dioxide to give 21-isovaleryloxy-11β,17α-dihydroxy - 4 - pregnene - 3,20 - dione (hydrocortisone 21-isovalerate).

In the manner given in Example 1, oxidizing with manganese dioxide:

(a) 21 - isovaleryloxy - 11α,17α,20α - trihydroxy - 4-pregnen-3-one yields 21-isovaleryloxy-11α,17α-dihydroxy-4-pregnene-3,20-dione.

(b) 11α,21 - diisovaleryloxy - 17α,20α - dihydroxy - 4-pregnen - 3 - one yields 11α,21 - diisolvaleryloxy - 17α-hydroxy-4-pregnene-3,20-dione.

(c) 21 - isovaleryloxy - 17α,20α - dihydroxy - 4 - pregnen - 3 - one yields 21 - isovaleryloxy - 17α - hydroxy-4-pregnene-3,20-dione (Reichstein's substance "S" isovalerate).

(d) 21 - isovaleryloxy - 17α,20 - dihydroxy - 4 - pregnene - 3,11 - dione yields 21 - isovaleryloxy - 17α- hydroxy-4-pregnene-3,11,20-trione (cortisone isovalerate).

EXAMPLE 7

21 - hexanoyloxy - 11β,17α - dihydroxy - 4 - pregnene-3,20 - dione from 21 - hexanoyloxy - 11β,17α,20α-trihydroxy-4-pregnen-3-one

In the manner given in Example 1, 21-hexanoyloxy-11β,17α,20α - trihydroxy - 4 - pregnen - 3 - one, dissolved in ethyl acetate, was oxidized with activated manganese dioxide to give 21-hexanoyloxy-11β,17α-dihydroxy-4-pregnene-3,20-dione (hydrocortisone 21-hexanoate).

In the manner given in Example 1, oxidizing with manganese dioxide:

(a) 21 - hexanoyloxy - 11α,17α,20α - trihydroxy - 4-pregnen-3-one yields 21-hexanoyloxy-11α,17α-dihydroxy-4-pregnene-3,20-dione.

(b) 11α,21 - dihexanoyloxy - 17α,20α - dihydroxy - 4-pregnen-3-one yields 11α,21-dihexanoyloxy-17α-hydroxy-4-pregnene-3,20-dione.

(c) 21 - hexanoyloxy - 17α,20α - dihydroxy - 4 - pregnen-3-one yields 21-hexanoyloxy-17α-hydroxy-4-pregnene-3,20-dione (Reichstein's substance "S" hexanoate).

(d) 21 - hexanoyloxy - 17α,20 - dihydroxy - 4 - pregnene - 3,11 - dione yields 21 - hexanoyloxy - 17α - hydroxy-4-pregnene-3,11,20-trione (cortisone hexanoate).

EXAMPLE 8

21 - (β - cyclopentylpropionyloxy) - 11β,17α - dihydroxy-4 - pregnene - 3,20 - dione from 21 - (β - cyclopentylpropionyloxy)-11β,17α,20α-trihydroxy-4-pregnen-3-one

In the manner given in Example 1, 21-(β-cyclopentylpropionyloxy) - 11β,17α,20α - trihydroxy - 4 - pregnen-3-one, dissolved in ethyl acetate was oxidized with activated manganese dioxide, prepared by method A of Harfenist et al., J. Org. Chem. 19, 1608 (1954), to give 21 - (β - cyclopentylpropionyloxy) - 11β,17α - dihydroxy-4 - pregnene - 3,20 - dione [hydrocortisone 21 - (β-cyclopentylpropionate)].

In the manner shown in Example 1, oxidizing with manganese dioxide:

(a) 21 - (β - cyclopentylpropionyloxy) - 11α,17α,20α-trihydroxy - 4 - pregnen - 3 - one yields 21 - (β - cyclopentylpropionyloxy) - 11α,17α - dihydroxy - 4 - pregnene-3,20-dione.

(b) 11,α21 - di - (β - cyclopentylpropionyloxy) - 17α,20α - dihydroxy - 4 - pregnen - 3 - one yields 11α,21-di - (β - cyclopentylpropionyloxy) - 17α - hydroxy - 4-pregnene-3,20-dione.

(c) 21-(β - cyclopentylpropionyloxy) - 17α,20α - dihydroxy-4-pregnen-3-one yields 21-(β-cyclopentylpropionyloxy) - 11α - hydroxy-4-pregnene-3,20-dione [Reichstein's substance "S" (β-cyclopentylpropionate)].

(d) 21 - (β - cyclopentylpropionyloxy) - 17α,20 - dihydroxy-4-pregnene-3,11-dione yields 21-(β-cyclopentylpropionyloxy)-17α-hydroxy-4-pregnene-3,11,20-trione (cortisone β-cyclopentylpropionate).

EXAMPLE 9

21 - benzoyloxy-11β,17α-dihydroxy-4-pregnene-3,20-dione from 21-benzoyloxy-11β,17α,20α-trihydroxy-4-pregnen-3-one

In the manner given in Example 1, 21-benzoyloxy-11β,17α,20α-trihydroxy - 4 - pregnen-3-one, dissolved in ethyl acetate, was oxidized with activated manganese dioxide, prepared by method B of Harfenist et al., J. Org. Chem. 19, 1608 (1954), to give 21-benzoyloxy-11β,17α-dihydroxy-4-pregnene-3,20-dione (hydrocortisone 21-benzoate).

In the manner shown in Example 1, oxidizing with manganese dioxide:

(a) 21 - benzoyloxy-11α,17α,20α-trihydroxy-4-pregnen-3-one yields 21 - benzoyloxy-11α,17α-dihydroxy-4-pregnene-3,20-dione.

(b) 11α,21-dibenzoyloxy-17α,20α-dihydroxy-4-pregnen-3-one yields 11α,21 - dibenzoyloxy-17α-hydroxy-4-pregnene-3,20-dione.

(c) 21-benzoyloxy-17α,20α-dihydroxy-4-pregnen-3-one yields 21-benzoyloxy-17α-hydroxy-4-pregnene-3,20-dione (Reichstein's substance "S" benzoate).

(d) 21-benzoyloxy-17α,20-dihydroxy-4-pregnene-3,11-dione yields 21-benzoyloxy-17α-hydroxy - 4 - pregnene-3,11,20-trione (cortisone benzoate).

EXAMPLE 10

21-phenylacetoxy-11β,17α-dihydroxy - 4 - pregnene - 3,20-dione from 21-phenylacetoxy-11β,17α,20α-trihydroxy-4-pregnen-3-one

In the manner given in Example 1, 21-phenylacetoxy-11β,17α,20α-trihydroxy-4-pregnen-3-one, dissolved in ethyl acetate, was oxidized with activated manganese dioxide to give 21-phenylacetoxy-11β,17α-dihydroxy-4-pregnene-3,20-dione (hydrocortisone 21-phenylacetate).

In the manner given in Example 1, oxidizing with manganese dioxide:

(a) 21 - phenylacetoxy-11α,17α,20α-trihydroxy-4-pregnen-3-one yields 21-phenylacetoxy-11α,17α-dihydroxy-4-pregnene-3,20-dione.

(b) 11α,21-diphenylacetoxy-17α,20α-dihydroxy-4-pregnen-3-one yields 11α,21-diphenylacetoxy-17α-hydroxy-4-pregnene-3,20-dione.

(c) 21-phenylacetoxy-17α,20α-dihydroxy-4-pregnen-3-one yields 21-phenylacetoxy-17α-hydroxy-4-pregnene-3,20-dione (Reichstein's substance "S" phenylacetate).

(d) 21-phenylacetoxy-17α,20-dihydroxy - 4 - pregnene-3,11-dione yields 21-phenylacetoxy-17α-hydroxy-4-pregnene-3,11,20-trione (cortisone phenylacetate).

EXAMPLE 11

21-salicyloyloxy-11β,17α-dihydroxy - 4 - pregnene - 3,20-dione from 21-salicyloyloxy-11β,17α,20α-trihydroxy-4-pregnen-3-one In the manner given in Example 1, 21-salicyloyloxy-11β,17α,20α-trihydroxy - 4 - pregnen-3-one, dissolved in ethyl acetate, was oxidized with activated manganese dioxide to give 21-salicyloyloxy-11β,17α-dihydroxy-4-pregnene-3,20-dione (hydrocortisone 21-salicylate).

In the manner given in Example 1, oxidizing with manganese dioxide:

(a) 21-salicyloyloxy-11α,17α,20α-trihydroxy-4-pregnen-3-one yields 21-salicyloyloxy-11α,17α-dihydroxy-4-pregnene-3,20-dione.

(b) 11α,21-disalicyloyloxy-17α,20α-dihydroxy - 4 - pregnen-3-one yields 11α,21-disalicyloyloxy-17α-hydroxy-4-pregnene-3,20-dione.

(c) 21-salicyloyloxy-17α,20α-dihydroxy - 4 - pregnen-3-one yields 21-salicyloyloxy-17α-hydroxy-4-pregnene-3,20-dione (Reichstein's substance "S" salicylate).

(d) 21 - salicyloyloxy - 17α,20 - dihydroxy-4-pregnene-3-11-dione yields 21 - salicyloyloxy-17α-hydroxy-4-pregnene-3,11,20-trione (cortisone salicylate).

EXAMPLE 12

21-(2-furoyloxy)-11β,17α-dihydroxy - 4 - pregnene-3,20-dione from 21-(2-furoyloxy)-11β,17α,20α-trihydroxy-4-pregnen-3-one In the manner given in Example 1, 21-(2-furoyloxy)-11β,17α,20α-trihydroxy - 4 - pregnen-3-one, dissolved in ethyl acetate, was oxidized with activated manganese dioxide to give 21-(2-furoyloxy)-11β,17α-dihydroxy-4-pregnene-3,20-dione [hydrocortisone 21-(2-furoate)].

In the manner given in Example 1, oxidizing the manganese dioxide:

(a) 21 - (2-furoyloxy)-11α,17α,20α-trihydroxy-4-pregnen-3-one yields 21-(2-furoyloxy)-11α,17α-dihydroxy-4-pregnene-3,20-dione.

(b) 11α,21-di-(2-furoyloxy)-17α,20α-dihydroxy-4-pregnen-3-one yields 11α,21-di-(2-furoyloxy)-17α-hydroxy-4-pregnene-3,20-dione.

(c) 21 - (2-furoyloxy)-17α,20α-dihydroxy-4-pregnen-3-one yields 21-(2-furoyloxy)-17α-hydroxy - 4 - pregnene-3,20-dione [Reichstein's substance "S" (2-furoate)].

(d) 21-(2-furoyloxy)-17α,20-dihydroxy - 4 - pregnene-3,11-dione yields 21-(2-furoyloxy)-17α-hydroxy-4-pregnene-3,11,20-trione (cortisone furoate).

EXAMPLE 13

21-bromoacetoxy-11β,17α-dihydroxy - 4 - pregnene - 3,20-dione from 21-bromoacetoxy-11β,17α,20α-trihydroxy-4-pregnen-3-one In the manner given in Example 1, 21-bromoacetoxy-11β,17α,20α-trihydroxy - 4 - pregnen-3-one, dissolved in ethyl acetate, was oxidized with activated manganese dioxide to give 21 - bromoacetoxy-11β,17α-dihydroxy-4-pregnene-3,20-dione (hydrocortisone 21-bromoacetate).

In the manner given in Example 1, oxidizing with manganese dioxide:

(a) 21-bromoacetoxy-11α,17α,20α-trihydroxy - 4 - pregnen-3-one yields 21-bromoacetoxy-11α,17α-dihydroxy-4-pregnene-3,20-dione.

(b) 11α,21-dibromoacetoxy-17α,20α-dihydroxy-4-pregnen-3-one yields 11α,21-dibromoacetoxy-17α-hydroxy-4-pregnene-3,20-dione.

(c) 21 - bromoacetoxy-17α,20α-dihydroxy-4-pregnen-3-one yields 21-bromoacetoxy-17α-hydroxy - 4 - pregnene-3,20-dione (Reichstein's substance "S" bromoacetate).

(d) 21-bromoacetoxy-17α,20-dihydroxy - 4 - pregnene-3,11-dione yields 21-bromoacetoxy-17α-hydroxy-4-pregnene-3,11,20-trione (cortisone bromoacetate).

EXAMPLE 14

21-nicotinyloxy-11β,17α-dihydroxy-4-pregnene-3,20-dione from 21 - nicotinyloxy-11β,17α,20α-trihydroxy-4-pregnen-3-one In the manner given in Example 1, 21-nicotinyloxy-11β,17α,20α-trihydroxy - 4 - pregnen-3-one, dissolved in ethyl acetate, was oxidized with activated manganese dioxide to give 21-nicotinyloxy-11β,17α-dihydroxy-4-pregnene-3,20-dione (hydrocortisone 21-nicotinate).

In the manner given in Example 1, oxidizing the manganese dioxide:

(a) 21-nicotinyloxy - 11α,17α,20α - trihydroxy-4-pregnen-3-one yields 21 - nicotinyloxy - 11α,17α-dihydroxy-4-pregnene-3,20-dione.

(b) 11α,21-dinicotinyloxy-17α,20α-dihydroxy-4 - pregnen-3-one yields 11α,21 - dinicotinyloxy - 17α-hydroxy-4-pregnene-3,20-dione.

(c) 21-nicotinyloxy-17α,20α-dihydroxy-4 - pregnen - 3-one yields 21-nicotinyloxy-17α-hydroxy-4-pregnene-3,20-dione (Reichstein's substance "S" nicotinate).

(d) 21-nicotinyloxy-17α,20 - dihydroxy - 4 - pregnene-3,11-dione yields 21 - nicotinyloxy - 17α-hydroxy-4-pregnene-3,11,20-trione (cortisone nicotinate).

EXAMPLE 15

21-cinnamyloxy-11β,17α - dihydroxy - 4 - pregnene - 3,20-dione from 21-cinnamyloxy-11β,17α,20α-trihydroxy-4-pregnen-3-one In the manner given in Example 1, 21-cinnamyloxy-11β,17α,20α-trihydroxy-4 - pregnen - 3 - one, dissolved in ethyl acetate, was oxidized with activated manganese dioxide to give 21-cinnamyloxy-11β,17α-dihydroxy-4-pregnene-3,20-dione (hydrocortisone 21-cinnamate).

In the manner given in Example 1, oxidizing the manganese dioxide:

(a) 21-cinnamyloxy-11α,17α,20α-trihydroxy - 4 - pregnen-3-one yields 21 - cinnamyloxy - 11α,17α-dihydroxy-4-pregnene-3,20-dione.

(b) 11α,21-dicinnamyloxy-17α,20α-dihydroxy-4 - pregnen-3-one yields 11α,21 - dicinnamyloxy - 17α-hydroxy-4-pregnene-3,20-dione.

(c) 21-cinnamyloxy-17α,20α-dihydroxy-4-pregnen - 3-one yields 21-cinnamyloxy-17α-hydroxy-4-pregnene-3,20-dione (Reichstein's substance "S" cinnamate).

(d) 21-cinnamyloxy-17α,20 - dihydroxy - 4 - pregnene-3,11-dione yields 21-cinnamyloxy-17α - hydroxy - 4 - pregnene-3,11,20-trione (cortisone cinnamate).

EXAMPLE 16

21-toluenesulfonyloxy-11β,17α - dihydroxy - 4 - pregnene-3,20-dione from 21 - toluenesulfonyloxy-11β,17α,20α-trihydroxy-4-pregnen-3-one In the manner given in Example 1, 21-toluenesulfonyloxy-11β,17α,20α-trihydroxy-4-pregnen-3-one, dissolved in ethyl acetate, was oxidized with activated manganese dioxide to give 21-toluenesulfonyloxy-11β,17α-dihydroxy-4-pregnene-3,20 - dione (hydrocortisone 21 - toluenesulfonate).

In the manner given in Example 1, oxidizing with manganese dioxide:

(a) 21-toluenesulfonyloxy-11α,17α,20α-dihydroxy - 4-pregnen-3-one yields 21-toluenesulfonyloxy-11α,17α-dihydroxy-4-pregnene-3,20-dione.

(b) 11α,21-ditoluenesulfonyloxy-17α,20α - dihydroxy-4-pregnen-3-one yields 11α,21-ditoluenesulfonyloxy-17α-hydroxy-4-pregnene-3,20-dione.

(c) 21-toluenesulfonyloxy-17α,20α-dihydroxy-4 - pregnen-3-one yields 21 - toluenesulfonyloxy - 17α-hydroxy-4-pregnene-3,20-dione (Reichstein's substance "S" toluenesulfonate).

(d) 21-toluenesulfonyloxy-17α,20-dihydroxy - 4 - pregnene - 3,11 - dione yields 21-toluenesulfonyloxy-17α-hydroxy-4-pregnene-3,11,20 - trione (cortisone toluenesulfonate).

EXAMPLE 17

21-hemisuccinyloxy-11β,17α-dihydroxy-4-pregnene - 3,20-dione (hydrocortisone 21-hemisuccinate) from 21-hemisuccinyloxy-11β,17α,20α-trihydroxy-4-pregnen-3-one In the manner given in Example 1, 21-hemisuccinyloxy-11β,17α,20α-trihydroxy-4 - pregnen - 3 - one, dissolved in ethyl acetate, was oxidized with activated manganese dioxide to give 21-hemisuccinyloxy-11β,17α-dihydroxy-4-pregnene-3,20-dione (hydrocortisone 21-hemisuccinate).

In the manner given in Example 1, oxidizing with manganese dioxide:

(a) 21-hemisuccinyloxy - 11α,17α,20α - trihydroxy - 4-pregnen-3-one yields 21-hemisuccinyloxy-11α,17α-dihydroxy-4-pregnene-3,20-dione.

(b) 11α,21-dihemisuccinyloxy-17α,20α - dihydroxy - 4-pregnen - 3 - one yields 11α,21-dihemisuccinyloxy-17α-hydroxy-4-pregnene-3,20-dione.

(c) 21-hemisuccinyloxy-17α,20α - dihydroxy - 4 - pregnen-3-one yields 21-hemisuccinyloxy-17α-hydroxy-4-pregnene-3,20-dione (Reichstein's substance "S" hemisuccinate).

(d) 21-hemisuccinyloxy-17α,20 - dihydroxy - 4 - pregnene-3,11-dione yields 21-hemisuccinyloxy-17α-hydroxy-4-pregnene-3,11,20-trione (cortisone hemisuccinate).

EXAMPLE 18

21 - trichloroacetoxy - 11β,17α - dihydroxy - 4 - pregnene-3,20-dione from 21-trichloroacetoxy-11β,17α,20α-trihydroxy-4-pregnen-3-one In the manner given in Example 1, 21-trichloroacetoxy-11β,17α,20α-trihydroxy-4 - pregnen - 3 - one, dissolved in ethyl acetate, was oxidized with activated manganese dioxide to give 21-trichloroacetoxy-11β,17α-dihydroxy-4-pregnene-3,20-dione (hydrocortisone 21-trichloroacetate).

In the manner shown in Example 1, oxidizing with manganese dioxide:

(a) 21-trichloroacetoxy - 11α,17α,20α - trihydroxy - 4-pregnen-3-one yields 21-trichloroacetoxy-11α,17α-dihydroxy-4-pregnene-3,20-dione.

(b) 11α,21-di-(trichloroacetoxy)-17α,20α - dihydroxy-4-pregnen-3-one yields 11α,21-di-(trichloroacetoxy)-17α-hydroxy-4-pregnene-3,20-dione.

(c) 21-trichloroacetoxy-17α,20α - dihydroxy - 4 - pregnen-3-one yields 21-trichloroacetoxy-17α-hydroxy-4-pregnene-3,20-dione (Reichstein's substance "S" trichloroacetate).

(d) 21-trichloroacetoxy - 17α,20 - dihydroxy - 4 - pregnene-3,11-dione yields 21-trichloroacetoxy-17α-hydroxy-4-pregnene-3,11,20-trione (cortisone trichloroacetate).

EXAMPLE 19

21-hemitartaryloxy-11β,17α-dihydroxy-4 - pregnene - 3,20-dione from 21-hemitartaryloxy-11β,17α,20α-trihydroxy-4-pregnen-3-one In the manner given in Example 1, 21-hemitartaryloxy-11β,17α,20α-trihydroxy-4 - pregnen - 3 - one, dissolved in ethyl acetate, was oxidized with activated manganese dioxide to give 21-hemitartaryloxy-11β,17α-dihydroxy-4-pregnene-3,20-dione (hydrocortisone 21-hemitartrate).

In the manner given in Example 1, oxidizing with manganese dioxide:

(a) 21-hemitartaryloxy - 11α,17α,20α - trihydroxy - 4-pregnen-3-one yields 21-hemitartaryloxy-11α,17α-dihydroxy-4-pregnene-3,20-dione.

(b) 11α,21-di-hemitartaryloxy-17α,20α-dihydroxy - 4-pregnen-3-one yields 11α,21-di-hemitartaryloxy-17α-hydroxy-4-pregnene-3,20-dione.

(c) 21-hemitartaryloxy-17α,20α-dihydroxy-4 - pregnen-3-one yields 21-hemitartaryloxy-17α-hydroxy-4-pregnene-3,20-dione (Reichstein's substance "S" hemitartrate).

(d) 21-hemitartaryloxy - 17α,20 - dihydroxy - 4 - pregnene-3,11-dione yields 21-hemitartaryloxy-17α-hydroxy-4-pregnene-3,11,20-trione (cortisone hemitartrate).

EXAMPLE 20

21 - thioglycollyloxy - 11β,17α - dihydroxy - 4 - pregnene-3,20-dione from 21-thioglycollyloxy-11β,17α,20α-trihydroxy-4-pregnen-3-one In the manner given in Example 1, 21-thioglycollyloxy-11β,17α,20α - trihydroxy-4-pregnen-3-one, dissolved in ethyl acetate, was oxidized with activated manganese dioxide to give 21-thioglycollyloxy-11β,17α-dihydroxy-4-pregnene-3,20-dione (hydrocortisone 21-thioglycollate).

In the manner given in Example 1, oxidizing with manganese dioxide:

(a) 21 - thioglycollyloxy - 11α,17α,20α - trihydroxy-4-pregnen-3-one yields 21-thioglycollyloxy-11α,17α-dihydroxy-4-pregnene-3,20-dione.

(b) 11α,21 - dithioglycollyloxy-17α,20α-dihydroxy-4-pregnen-3-one yields 11α,21-dithioglycollyloxy-17α-hydroxy-4-pregnene-3,20-dione.

(c) 21-thioglycollyloxy - 17α,20α - dihydroxy-4-pregnen-3-one yields 21-thioglycollyloxy-17α-hydroxy-4-pregnene-3,20-dione (Reichstein's substance "S" thioglycollate).

(d) 21-thioglycollyloxy - 17α,20 - dihydroxy-4-pregnene-3,11-dione yields 21-thioglycollyloxy-17α-hydroxy-4-pregnene-3,11,20-trione (cortisone thioglycollate).

In the manner described in Examples 1 through 20 by reacting other 21-acyloxy-11β,17α,20α-trihydroxy-4-pregnen-3-ones, 21-acyloxy-11α,17α,20α - trihydroxy-4-pregnen-3-ones, 11α,21-diacyloxy-17α,20α-dihydroxy-4-pregnen-3-ones, and 21-acyloxy-17α,20α - dihydroxy-4-pregnene-3-ones wherein the acyloxy group is AcO, Ac being the acyl radical of a carboxylic acid containing from one to eight carbon atoms with activated manganese dioxide in an organic solvent, such as ethyl acetate, acetone, dioxane, benzene, carbon tetrachloride, chloroform, methylene chloride, at room temperature for a period of one through ten days the corresponding 21-acyloxy-11β,17α - dihydroxy-4-pregnene-3,20-diones (hydrocortisone 21-acylates), epi "F" 21-mono- and 11α,21-diacylates, Reichstein's compound "S" 21-acylates and cortisone 21-acylates are obtained, such as the formates, heptanoates, octanoates, toluates, gallates, anisates, benzenesulfonates, para-chlorobnzenesulfonates, benzenephosphonates, trimethylacetates, dichloroacetates para-chlorobenzoates, para-bromobenzoates, meta-nitrobenzoates, 3,5-dinitrobenzoates, hemiquinolinates, piperonates dihydrogencitrates, maleates, fumarates, crotonates, β-methylcrotonates, or the like.

It is to be understood that this invention is not to be limited to the exact details of operation or exact compounds shown and described, as obvious modifications and equivalents will be apparent to one skilled in the art, and the invention is therefore to be limited only by the scope of the appended claims.

I claim:

1. A process for the oxidation of the 20α-hydroxy group of 21-acyloxy-17α,20α-dihydroxy-4-pregnen-3-ones which comprises: selectively oxidizing a 21-acyloxy-17α,20α-dihydroxy-4-pregnen-3-one wherein the acyloxy group is AcO, Ac being the acyl radical of an organic carboxylic acid containing from one to eight carbon atoms, inclusive, with a suspension of activated manganese dioxide in an organic solvent to obtain the corresponding 21-acyloxy-17α-hydroxy-4-pregnen-3,20-dione.

2. A process for the oxidation of the 20α-hydroxy group of 21-acyloxy-17α,20α-dihydroxy-4-pregnen-3-ones which comprises: selectively oxidizing a 21-acyloxy-17α,20α-dihydroxy-4-pregnen-3-one wherein the acyloxy group is AcO, Ac being the acyl radical of a hydrocarbon carboxylic acid containing from one to eight carbon atoms, inclusive, with a suspension of activated manganese dioxide in an organic solvent at a temperature between about minus ten and about plus sixty degrees centigrades to obtain the corresponding 21-acyloxy-17α-hydroxy-4-pregnene-3,20-dione.

3. A process for the production of 21-acyloxy-11β,17α-dihydroxy-4-pregnene-3,20-diones which comprises: selectively oxidizing a 21-acyloxy-11β,17α,20α-trihydroxy-4-pregnen-3-one wherein the acyloxy group is AcO, Ac being the acyl radical of an organic carboxylic acid containing from one to eight carbon atoms, inclusive, with a suspension of activated manganese dioxide in an organic solvent to obtain the corresponding 21-acyloxy-11β,17α-dihydroxy-4-pregnene-3,20-dione.

4. A process for the production of 21-acyloxy-11β,17α-dihydroxy-4-pregnene-3,20-diones which comprises: selectively oxidizing 21-acyloxy-11β,17α,20α-trihydroxy-4-pregnen-3-one wherein the acyloxy group is AcO, Ac being the acyl radical of a hydrocarbon carboxylic acid containing from one to eight carbon atoms, inclusive, with a suspension of activated manganese dioxide in an organic solvent at a temperature between about minus ten and about plus sixty degrees centigrade to obtain the corresponding 21-acyloxy-11β,17α-dihydroxy-4-pregnene-3,20-dione.

5. A process for the production of 21-acetoxy-11β,17α-dihydroxy-4-pregnene-3,20-dione which comprises selectively oxidizing 21-acytoxy-11β,17α,20α-trihydroxy-4-pregnen-3-one with a suspension of activated manganese dioxide in an organic solvent to obtain 21-acetoxy-11β,17α-dihydroxy-4-pregnene-3,20-dione.

6. A process for the production of 21-acetoxy-11β,17α-dihydroxy-4-pregnene-3,20-dione, which comprises selectively oxidizing 21-acytoxy-11β,17α,20α-trihydroxy-4-pregnen-3-one with a suspension of activated manganese dioxide in ethyl acetate at a temperature between about plus ten to about plus thirty degrees centigrade to obtain 21-acetoxy-11β,17α-dihydroxy-4-pregnene-3,20-dione.

7. A process for the production of 21-propionyloxy-11β,17α-dihydroxy-4-pregnene-3,20-dione which comprises selectively oxidizing 21-propionyloxy-11β,17α,20α-trihydroxy-4-pregnen-3-one with a suspension of activated manganese dioxide in an organic solvent to obtain 21-propionyloxy-11β,17α-dihydroxy-4-pregnene-3,20-dione.

8. A process for the production of 21-propionyloxy-11β,17α-dihydroxy-4-pregnene-3,20-dione, which comprises selectively oxidizing 21-propionyloxy-11β,17α,20α-trihydroxy-4-pregnen-3-one with a suspension of activated manganese dioxide in ethyl acetate at a temperature between about plus ten to about plus thirty degrees centigrade to obtain 21-propionyloxy-11β,17α-dihydroxy-4-pregnene-3,20-dione.

9. A process for the production of 21-(β-cyclopentylpropionyloxy) - 11β,17α - dihydroxy - 4 - pregnene - 3,20-dione, which comprises selectively oxidizing 21-(β-cyclopentylpropionyloxy) - 11β,17α,20α - trihydroxy - 4 - pregnen-3-one with a suspension of activated manganese dioxide in ethyl acetate to obtain 21-(β-cyclopentylpropionyloxy)-11β,17α-dihydroxy-4-pregnene-3,20-dione.

10. A process for the production of 21-benzoyloxy-11β,17α-dihydroxy-4-pregnene-3,20-dione, which comprises selectively oxidizing 21-benzoyloxy-11β,17α,20α-trihydroxy-4-pregnen-3-one with a suspension of activated manganese dioxide in ethyl acetate to obtain 21-benzoyloxy-11β,17α-dihydroxy-4-pregnene-3,20-dione.

11. A process for the production of 21-(2-furoyloxy)-11β,17α-dihydroxy-4-pregnene-3,20-dione, which comprises selectively oxidizing 21-(2-furoyloxy)-11β,17α,20α-trihydroxy-4-pregnen-3-one with a suspension of activated manganese dioxide in ethyl acetate to obtain 21-(2-furoyloxy)-11β,17α-dihydroxy-4-pregnene-3,20-dione.

References Cited in the file of this patent

UNITED STATES PATENTS

| | | |
|---|---|---|
| 2,462,133 | Sarett | Feb. 22, 1949 |
| 2,492,189 | Sarett | Dec. 27, 1949 |
| 2,739,974 | Colton | Mar. 27, 1956 |

FOREIGN PATENTS

| | | |
|---|---|---|
| 1,077,139 | France | Apr. 28, 1954 |